United States Patent [19]
Svantesson

[11] 3,799,511
[45] Mar. 26, 1974

[54] METHOD OF FORMING A SOLUTION OF GAS AND LIQUID INTRODUCING SUCH SOLUTION INTO A BODY OF LIQUID

[75] Inventor: Sven Elis Åke Svantesson, Bromma, Sweden

[73] Assignee: Aktiebolaget Electrolux, Stockholm, Sweden

[22] Filed: Feb. 3, 1972

[21] Appl. No.: 223,347

[30] Foreign Application Priority Data
Feb. 9, 1971  Sweden.............................. 1585/71

[52] U.S. Cl.................. 261/29, 261/120, 261/123, 261/124, 261/DIG. 75
[51] Int. Cl................................................ B01f 3/04
[58] Field of Search ...... 261/DIG. 75, 29, 123, 120, 261/121 M, 77; 210/13, 142

[56] References Cited
UNITED STATES PATENTS

| 3,503,593 | 3/1970 | Nelson | 261/29 |
| 3,643,403 | 2/1972 | Speece | 261/DIG. 75 |
| 3,452,966 | 7/1969 | Smolski | 261/123 |
| 2,241,337 | 5/1941 | Work | 261/DIG. 75 |
| 3,470,091 | 9/1969 | Budd et al. | 261/120 |
| 3,365,178 | 1/1968 | Bood | 261/DIG. 75 |
| 3,400,818 | 9/1968 | Tarjan | 261/DIG. 75 |
| 2,515,538 | 7/1950 | Wall | 261/121 M |
| 3,653,641 | 4/1972 | Evon | 261/120 |
| 543,411 | 7/1895 | Taylor | 261/DIG. 75 |
| 558,018 | 4/1896 | Goldsmith | 210/242 |

FOREIGN PATENTS OR APPLICATIONS
111,720  12/1917  Great Britain.............. 261/DIG. 75

*Primary Examiner*—Tim R. Miles
*Attorney, Agent, or Firm*—Edmund A. Fenander

[57] ABSTRACT

For efficiently dissolving a gas in liquid and introducing the solution of gas and liquid in a body of liquid, the gas initially is mixed with liquid. The mixture of gas and liquid is then subjected for an adequate length of time to a pressure sufficiently greater than that prevailing at the liquid surface of the liquid body for the gas to dissolve in the liquid to form a solution of the gas and liquid. Without any significant change in pressure, the solution of gas and liquid is then introduced free of turbulence into the body of liquid below the liquid surface level thereof.

1 Claim, 2 Drawing Figures 3,799,511

METHOD OF FORMING A SOLUTION OF GAS AND LIQUID INTRODUCING SUCH SOLUTION INTO A BODY OF LIQUID

BACKGROUND OF THE INVENTION

1. Field of the Invention

The problem of dissolving a gas in a liquid has become of immediate interest in oxygenating polluted water which can be waste water or water in a polluted stream. Such polluted water lacks oxygen which must be replaced if the water again can be effectively employed for different useful purposes.

2. Description of the Prior Art

It is known to oxygenate polluted water by the so-called air-bubble method. In this method air bubbles are discharged from a pipe located at a given depth in a body of water. As the air bubbles ascend and rise toward the surface of the liquid body oxygen is given off to the water. This produces a strong upward flow or surge of water so that the oxygenated water is subjected to a sudden or quick decrease in pressure. This in turn causes a spontaneous release of a great part of the oxygen that has dissolved in the water. Also, the interval of time during which the air bubbles are in contact with the water is very short.

It is also known to oxygenate water by the so-called surface-aeration method. In this method air contacts water at atmospheric pressure. By agitating a mixture of air and water it has been possible to obtain somewhat better results than realized by the air-bubble method although the efficiency of the surface-aeration method nevertheless has been comparatively low.

Tests also have been conducted in which a gas, such as oxygen, for example, is dissolved under high pressure in a small quantity of liquid. Due to the decrease in pressure that occurs when the solution of gas and liquid is delivered to the body of liquid, the resulting spontaneous release of gas impairs the efficiency considerably, which is objectionable.

SUMMARY OF THE INVENTION

My invention relates to a method of dissolving a gas in a liquid, such as, for example, oxygen in water, and introducing the solution of gas and liquid free of turbulence into a body of liquid.

It is an object of my invention to provide such an improved method which is extremely efficient and yet simple and inexpensive. I accomplish this by initially mixing gas with liquid in a place out of physical contact with the body of liquid. The mixture of gas and liquid at such place is then subjected for an adequate length of time to a pressure sufficiently greater than that prevailing at the liquid surface of the liquid body to force the gas to dissolve in the liquid and form a solution of the gas and liquid. Without any significant change in pressure, the solution of gas and liquid then flows free of turbulence from the upper part of such place into the body of liquid below the liquid surface thereof. Such flow of the solution from the place free of turbulence is induced solely by displacement of the solution by the gas and liquid introduced into the place and flowing upward therein.

DESCRIPTION OF THE PREFERRED EMBODIMENT

Figure 1:
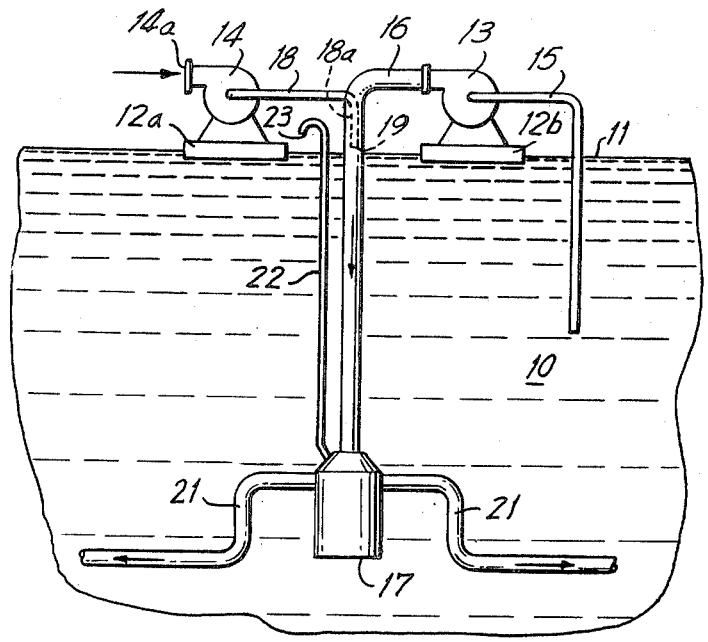
FIG. 1 is a view more or less diagrammatically illustrating apparatus which embodies my invention for dissolving gas into liquid and introducing the solution into a body of liquid.
Figure 2:
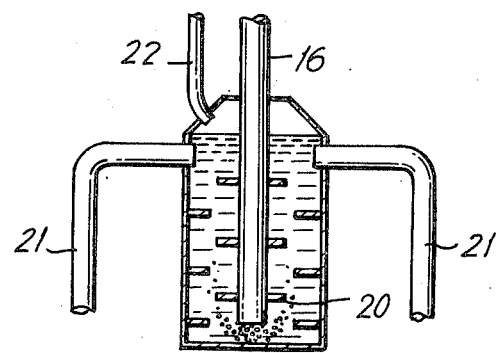
FIG. 2 is an enlarged fragmentary sectional view of parts shown in FIG. 1 to illustrate details more clearly.

In the drawing, a body of liquid, such as water, for example, has a liquid surface 11 at which floats 12a and 12b are disposed for respectively carrying an air pump 14 and a liquid pump 13. Liquid is supplied to the pump 13 through a pipe 15 which extends vertically downward to the bottom of the liquid body 11. It will be understood that liquid can be supplied to the pump 13 from any other available source of supply. Hence, instead of supplying polluted water to the pump 13 through the pipe 15 from the liquid body 10, available clean water can be supplied to the pump.

Liquid is discharged from the pump 13 into a conduit 16 which extends downward into the body of liquid 10. The air pump 14 draws ambient air into the pump inlet 14a and air under pressure is discharged from the pump through a pipe 18 having its outer end 18a disposed within the conduit 16. The air under pressure emerges from the pipe 18 at 19 and a mixture of air and liquid flows downward in the conduit 16 from 19 to a vessel 17. To make certain that air introduced into the conduit 16 will flow downward with liquid to the vessel 17, liquid is discharged from the liquid pump at such a rate that the liquid flows downward in the conduit 16 at a velocity which preferably exceeds 40 cm./sec.

The vessel 17 represents an intermediate region or place in the path of flow of the gas and liquid which is out of physical contact with the body of liquid 10. The conduit 16 extends downward within the vessel 17 and the mixture of gas and liquid is discharged from the lower open end of the conduit at a region which is near to the bottom of the vessel. With this construction the mixture of gas and liquid must ascend and flow upward for practically the entire height of the vessel 17. The outer surface of the conduit 16 and inner surface of the vessel 17 are respectively provided with baffles or fins 20 and 20a which extend toward one another and function to stir the mixture of gas and liquid and promote mixing thereof.

The interval of time that the gas and liquid are in contact with one another in the conduit 16 can be neglected and disregarded for the reason that the gas and liquid move very rapidly therethrough to the vessel 17. However, the vessel 17 is so constructed and formed that it takes a considerable length of time, preferably at least 3 minutes, for the mixture to pass upward through the vessel from the bottom thereof to the higher level at which pipes 21 are connected thereto. This means that the volume of the vessel 17 is sufficiently large relative to the volume of the air-liquid mixture flowing through the conduit 16 per unit interval of time that it will take at least 3 minutes to pass upward in the vessel from the lower open end of the conduit to the level at which the pipes 21 are connected to the vessel. In this way the mixture of air and liquid in the vessel 17, while out of physical contact with the body of liquid 10 is subjected for an adequate interval of time to a pressure sufficiently greater than that prevailing at the liquid surface 11 of the liquid body for the air to dissolve in the liquid and form a solution of the air and liquid.

Therefore, the air-liquid mixture flows upward very slowly in the vessel 17 and the air-liquid solution formed therein flows through the pipes 21 into the body of liquid 10 at a velocity which is very slow and free of turbulence and without any significant change in pressure. This is so because the outlet ends of the pipes 21 are generally located at the same depth as the vessel 17 in the body of liquid 10. Further, the flow of the solution of gas and liquid from the upper part of the vessel 17 without turbulence is induced solely by displacement of such solution by the gas and liquid introduced into the vessel 17.

In accordance with my invention, therefore, a layer or strata of liquid will be formed in the body of liquid 10 in which more dissolved oxygen is present than in parts of the liquid body adjacent thereto. This layer or strata of liquid serves as an oxygen reserve in the body of liquid 10. A condition which must be satisfied to maintain this oxygen reserve is the absence of any strong upward flow of gas in the body of liquid 10. Hence, it is necessary to avoid any upward flow of gas or air which has not dissolved in the liquid flowing upward in the vessel 17. I accomplish this by providing a vent pipe 22 which extends upward through the body of liquid 10 from the upper part of the vessel 17 and has an opening 23 above the liquid surface level 11. In this way excess air present in the vessel 17 is collected and removed continuously through the pipe 22. This is particularly important because, as if often desired, a greater quantity of air is supplied to the conduit 16 by the air pump 14 than can go into solution in liquid in the vessel 17.

The vessel 17 can be of such size and the mixture of air and liquid can flow through the conduit at such a rate that a cushion of air will be maintained continuously in the top part of the vessel 17. In order to insure that such an air cushion will be maintained, the vessel 17 can be provided with overflow protection, such as, for example, an additional discharge pipe (not shown) which is connected to the upper part of the vessel.

It will be understood that if the depth of the body of liquid 10 permits, the vessel 17 can be located at a great depth so that the air and liquid therein will be subjected to a high pressure without any need for increasing the capacity of the liquid pump 13 to any significant extent.

The high efficiency at which gas is dissolved in liquid and such solution is introduced without turbulence in a body of liquid in accordance with my invention is dependent upon the simultaneous presence of three factors, as follows:

1. Physical contact between the gas and liquid in the vessel 17 for a long interval of time.
2. The mixture of gas and liquid is subjected to pressure in the vessel 17 which is considerably greater than the pressure at the surface of the body of liquid 10 which is atmospheric pressure. By way of example, generally twice the quantity of gas dissolves in the liquid when the pressure is doubled.
3. When the solution of gas and liquid is supplied to the body of liquid 10 it is not subjected to any change of pressure which is considerable. In this way spontaneous release of gas is avoided and the high efficiency at which gas is dissolved in the liquid will not be impaired.

To insure such high efficiency a quantity of gas is mixed with the liquid that is greater than can be dissolved in the liquid. In order to prevent gas that is not dissolved from ascending in the body of liquid to induce upward flow of liquid and effect a relatively quick decrease in pressure of gas-liquid solution and a spontaneous release of gas, the gas not dissolved in the liquid is removed from the liquid before the gas-liquid solution is supplied to the body of liquid. Further, the solution of gas and liquid is not introduced into the body of liquid in a violent manner but rather is gently supplied to the liquid body and distributed over a wide area in the liquid.

I claim:

1. The method of forming a solution of gas and liquid and introducing such solution into a body of liquid which comprises the steps of
   a. mixing the gas with liquid,
   b. flowing the mixture of gas and liquid upwardly in a place out of physical contact with the body of liquid,
   c. subjecting the mixture of gas and liquid for at least 3 minutes, during upward flow thereof in such place, to a pressure sufficiently greater than that prevailing at the liquid surface of the liquid body for the gas to dissolve in the liquid and form a solution of the gas and liquid,
   d. continuously collecting and removing undissolved gas from the upper part of said place,
   e. flowing only the solution of gas and liquid free of turbulence from the upper part of said place to a region of the body of liquid below the surface level thereof without any significant change in pressure, and
   f. inducing flow of the solution of gas and liquid free of turbulence from the upper part of said place solely by displacement of such solution by the gas and liquid introduced into said place.

* * * * *